US007444412B2

(12) United States Patent
Owhadi (10) Patent No.: US 7,444,412 B2
(45) Date of Patent: Oct. 28, 2008

(54) DATA PROCESSING SYSTEM AND METHOD

(75) Inventor: Eric Owhadi, Sassenage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1194 days.

(21) Appl. No.: 10/165,864

(22) Filed: Jun. 7, 2002

(65) Prior Publication Data

US 2003/0028655 A1 Feb. 6, 2003

(30) Foreign Application Priority Data

Jun. 8, 2001 (EP) ................... 01410068

(51) Int. Cl.
*G06F 15/16* (2006.01)
*G06F 12/00* (2006.01)
(52) U.S. Cl. .............. 709/229; 709/226; 713/201
(58) Field of Classification Search ......... 709/102–229, 709/232; 713/201
See application file for complete search history.

(56) References Cited

U.S. PATENT DOCUMENTS

| | | | | |
|---|---|---|---|---|
| 6,473,794 B1 * | 10/2002 | Guheen et al. | ............. | 709/223 |
| 6,502,102 B1 * | 12/2002 | Haswell et al. | ............. | 707/102 |
| 6,571,285 B1 * | 5/2003 | Groath et al. | ............. | 709/223 |
| 6,697,824 B1 * | 2/2004 | Bowman-Amuah | ......... | 709/229 |
| 6,904,449 B1 * | 6/2005 | Quinones | .................. | 709/203 |
| 2002/0046262 A1 * | 4/2002 | Heilig et al. | ................ | 709/219 |
| 2005/0114468 A1 * | 5/2005 | Philyaw | ..................... | 709/217 |

FOREIGN PATENT DOCUMENTS

| | | |
|---|---|---|
| EP | 0 333 620 A2 | 3/1989 |
| WO | 98/14890 A1 | 4/1998 |

OTHER PUBLICATIONS

Rothermel et al., A safe, efficient regression test selection technique. ACM Transactions on software engineering and methology (TOSEM), Apr. 1997, vol. 6, issue 2.*
"Today's News." Internet: <URL: web.archive.org/web/*/www.4developers.com/fd/> 2 pages (Mar. 20, 2001).
"Establishing Trust for Downloaded Software." Netscape Communications Corporation: <http://developer.netscape.com/docs/manuals/signedobj/trust/owp> 18 pages (Jul. 2, 1997).

* cited by examiner

*Primary Examiner*—Zarni Maung
(74) *Attorney, Agent, or Firm*—Ladas & Parry, LLP (57) ABSTRACT

The present invention relates to a data processing system and method for providing support and maintenance services to a computer with at least reduced and preferably minimal user interaction. Data, that ordinarily would be inaccessible to a non-trusted applet, is, prior to any use of that data by such a non-trusted applet collated with the permission of the user of the computer by a trusted applet. The trusted applet has a greater range of access to system configuration as compared to the non-trusted applet. However, invoking a trusted applet requires user interaction; namely, the user must grant permission for the trusted applet to access the system configuration information and platform identification data. The necessary system configuration information that is required for the provision of support and maintenance services is harvested by the trusted applet and stored within a cookie. Therefore, the non-trusted applet can be downloaded and can access the relevant information without having involve the user.

7 Claims, 3 Drawing Sheets

DATA PROCESSING SYSTEM AND METHOD

The present invention relates to a data processing system and method and, more particularly, to such a system and method to provide support and maintenance services for computers.

It will be appreciated by those skilled in the art, that computer support and maintenance, in particular if it involves sending technically trained personnel to a customer site, represents a significant financial burden for the suppliers of any such support and maintenance. Therefore, within today's web-enabled environment, it is common practice for the vast majority of computer manufacturers to have arranged, to the maximum extent they possibly can, to provide such support and maintenance using web-servers.

However, the use of web-based support and maintenance services typically requires that the user of a computer knows a reasonable amount of technical information regarding the operation of computers and associated software. For example, if a computer has a defective or out of date video driver for a video card, the user, to update the video driver, firstly, must know of the existence of and interaction between both the video card and the video driver and, secondly, to fix or update the driver, must be capable of identifying the correct driver from the host of drivers that are usually presented by support and maintenance web servers.

Furthermore, if a manufacturer of computers discovers a bug associated with either the hardware or software of computers that have already been shipped, the manufacturer is usually obliged to remedy the situation under the warranty terms associated with the sale or lease of the shipped computers. It will be appreciated that bugs which have been identified after shipment can affect a potentially large number of computers. Therefore, such bugs are known within the art as class issues, that is, a problem is known to exist which affects a large class of computers. A significant problem faced by a manufacturer upon identification of a class issue is the location of computers that are affected by the class issue and the administration of the appropriate support and maintenance associated with addressing such class issues. Even once the computers adversely affected by a class issue have been located, the technical issues involved and the possible need for technical personnel to make a field visit to address the class issue represent a significant drain on resources.

It is an object of the present invention at least to mitigate the problems of the prior art.

Accordingly, a first aspect of the present invention provides a method for processing data within a first computer comprising at least a first memory for storing data relating to the system resources of the first computer; the system resources comprising at least one of hardware and software of the first computer; the method comprising the steps of:

storing the data relating to the system resources in the first memory of the first computer;

receiving, from a second computer, data identifying at least one technical issue potentially associated with the system resources;

determining whether or not data relating to the system resources corresponds to the data identifying the at least one technical issue; and outputting a message relating to the at least one technical issue if the data relating to the system resources corresponds to the data identifying the at least one technical issue.

Advantageously, the embodiments of the present invention facilitate identification and resolution of class issues in an automated manner without the need to involve the user.

A second aspect of the present invention provides a data processing method for a second computer comprising storage for storing at least one of a first and second type of application for execution by a first computer and data relating to at least one technical issue; the first type of application being capable of accessing a greater range of system resources of the first computer than the second type of application; the method comprising the steps of:

transmitting the second application and the data relating to the at least one technical issue to the first computer; the second application being arranged to access data relating to system resources of the first computer;

receiving, from the first computer in response to transmitting the second application, a request for data to resolve the at least one technical issue; and transmitting the requested data to the first computer.

An embodiment provides a data processing method farther comprising the steps of receiving, from the first computer, a request for information; and transmitting, to the first computer, in response to the request for information, the first type of application to collate data relating to the system resources of the first computer that are not accessible by the second type of application and to store the collated data within the system resources of the first computer that are accessible by the second type of application.

Preferably, the first type of application is a trusted application such as, for example, a trusted ActiveX application or a trusted Java applet. Suitably, user authorisation is required before the applet can collate the data relating to system resources. Still more preferably, the second type of application is a non-trusted application, such as, for example, a non-trusted Java applet or a non-trusted ActiveX application.

Due to the first type of application, that is, the trusted application, being capable of operating outside of the "sandbox" and being able to collate the data relating to system resources, the second type of application, that is, the non-trusted application, which can only operate within the sandbox, can gain access to the data relating to system resources without having to obtain user authorisation or notify the user of such access. Suitably, the identification and/or resolution of class issues can be undertaken autonomously.

Embodiments of the present invention will now be described, by way of example only, with reference to the accompanying drawings in which.

Figure 1:
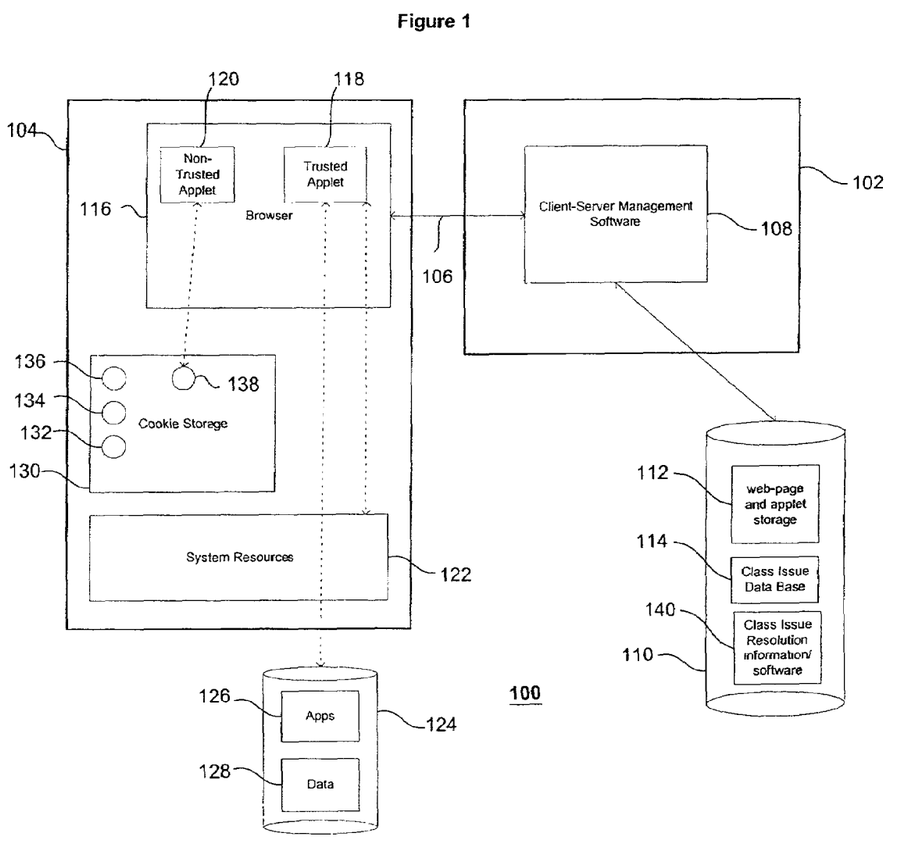
FIG. 1 shows a system for providing maintenance and support services for a computer according to a first embodiment.

Referring to FIG. 1 there is shown a computer system 100 comprising a server 102 for providing, for example, maintenance and support services to a client computer 104 via a suitable communication network or link 106.

The server 102 has client-server management software 108 which manages the interaction of the server 102 with incoming requests from the client machine 104, the retrieval of information/data from a file repository 110 and the dissemination of that information/data.

The file repository 110 is used to store various web-pages and associated applets 112. The file repository also stores a file 114 that identifies or relates to technical problems such as, for example, class issues, which may adversely affect the performance of the client machine 104.

As discussed above in relation to the prior art, conventionally the client machine 104 is used to access the web server 102 to obtain, for example, the latest version of, for example, the BIOS and/or drivers, for the client machine 104. However, as also discussed above, such an arrangement relies upon the user of the client machine 104 being sufficiently knowledgeable and motivated to obtain assistance from the support and maintenance server 102. Hence, the embodiments of the present invention have been arranged to facilitate, that is, automate, the identification of a need for support and, preferably, the provision of support and maintenance services.

It can be appreciated from FIG. 1 that the client machine 104 comprises a browser 116 which has, either separately or concurrently, a trusted applet 118 and a non-trusted applet 120 embedded within a web-page (not shown) retrieved from the server 102. The trusted applet 118 can access a significantly greater range of system resources of the client machine 104 than the non-trusted applet 102, that is, within a Java context, the trusted application or applet can operate outside of a confined run-time environment while the non-trusted application or applet can operate only within the confined run-time environment.

As known in the field of Java programming, the expression sandbox refers to a confined runtime environment. These are sometimes also called rubber-walled "jail" environments and are notional spaces within a computer in which certain programs can run in isolation from the host system. This can also refer to the safe mode of the Java Virtual Machine which turns on when a Java applet is run inside a web browser. Such an environment can be used to run untrusted Java applets that are downloaded from the web. Practically, a sandbox is a set of limitations or restrictions which are imposed on untrusted applets and are designed to prevent those applets from compromising the client system. This is done by disallowing access to certain APIs by means of security exceptions.

The system resources 122 may include both system memory and off-line storage 124 which may store both applications 126 and data 128, any devices connected to or accessible by the client machine 104, as well as associated software.

Associated with the browser 116 is a region of non-volatile storage 130 which is used to store data that is accessible by the non-trusted applet 120. The area of non-volatile storage is within the sand-box or coned run-time environment. Preferably, the data takes the form of files that are known conventionally as cookies 132 to 138. The non-trusted applet 120, while being able to access the region of non-volatile storage 130, cannot access the same range of system resources which can be accessed by the trusted applet 118, that is, the non-trusted applet can access fewer of the system resources than the trusted applet 118.

Conventionally, cookies 132 to 138 are associated with web-pages. The cookies 132 to 138 are stored within a predetermined region 130 of the memory of the client machine. Preferably, one of the plurality of cookies, such as for example, a cookie 138, has been created and deposited in response to the collation of data relating to the system resources 122 and 124 of the client machine 104.

Within an embodiment, the trusted applet 118 is used to collate the data relating to the system resources 122 and 124 of the client machine 104. Preferably, the collated data includes configuration data that identifies the current hardware and software configuration of the client machine 104. Additionally, the system resources may comprise applications 126 and data 128 resident on a storage medium, such as a HDD 124, or resources that are accessible by the client machine 104.

Figure 2:
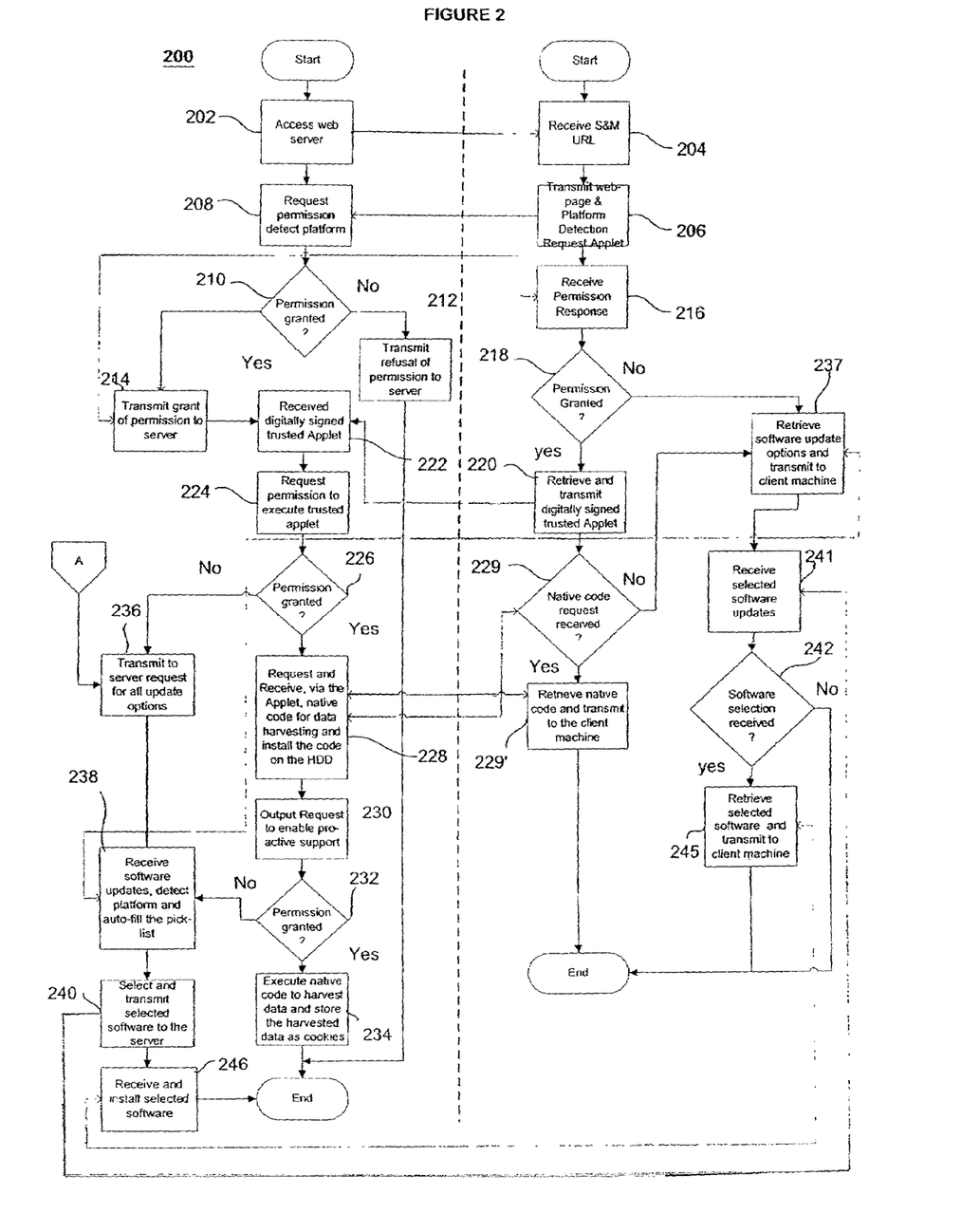
FIG. 2 depicts a flow chart for harvesting information from the computer to assist in providing the maintenance and support services.

Referring to FIG. 2 there is shown a flow chart 200 of an embodiment which describes the processing undertaken by the client machine 104 and server 102 shown in FIG. 1. At step 202, a user of the client machine via the browser 116 and an appropriate URL that is directed to, for example, a support and maintenance web-page, accesses the server 102 to obtain support and maintenance assistance.

The client-server management software 108 receives the request for support and maintenance URL from the client machine 104 at step 204.

In response to receiving the support and maintenance URL, the client-server management software 108 retrieves from the file repository 110 a web-page (not shown) and transmits the web-page to the client machine 104 at step 206. The web-page transmitted at step 206 requests permission from the user of be client machine 104 to undertake system configuration and platform/device detection investigations. Therefore, in response to receiving, at step 208, the transmitted web-page 112, the browser 116 upon rendering the transmitted web-page outputs a request to the user for permission to undertake such investigations. It is determined at step 210 whether or not such permission was granted. If permission was not granted, the client machine 104 transmits, at step 212, notification of the refusal to the server 102. However, if permission was granted, the grant of such permission is transmitted, at step 214, to the sewer 102. The server 102 receives the response to the request for permission to undertake system configuration and platform/device detection at step 216 and determines at step 218 whether permission has been granted.

If it is determined that at step 218 that permission was granted, the server 102 retrieves from the file repository 110 a trusted applet 118 and transmits that trusted applet 118, which is digitally signed, to the client machine 104 at step 220. The digitally signed applet is received at step 222.

As will be appreciated by those skilled in the art, the receipt of a digitally signed applet causes that applet to produce a pop-up dialogue window which, firstly, informs the user of the client machine 104 of the receipt of such an applet and, secondly, solicits from the user permission to allow the trusted applet to perform its intended function. It can be appreciated from FIG. 2 that the user is requested, at step 224, in response to receiving the digitally signed applet, at step 222, for permission to execute the trusted applet 118. It is determined at step 226 whether or not permission to execute the trusted applet 118 has been granted. If it is determined, at step 226, that permission has been granted, the trusted applet is arranged to execute or to request, receive and execute native code for harvesting system configuration and hardware platform identification data at step 228. Appropriately, the trusted applet 118 transmits a request for the native code to the server 102. It is determined at step 229 whether a request for native code has been received. If it is determined that a request for native code has been received, the requested code is retrieved from the file repository 110 and transmitted to the trusted applet 118 running at the client machine 102 at step 229'.

Preferably, the trusted applet 118 outputs a dialogue box (not shown) at step 230 which provides the option to the user to enable pro-active maintenance and support. It is determined at step 232 whether or not pro-active support should be enabled. If the determination at step 232 is such that permission was granted to enable pro-active support and maintenance, the trusted applet, by executing the received native code, at step 234, collates the data relating to system resources and stores the collated data within the non-volatile storage region 130 that can be subsequently accessed by the non-trusted applet 120. Preferably, the collated data is stored within a cookie 138 in the non-volatile storage region 130 that is accessible to the non-trusted applet 120.

If it is determined at step 226 that permission was not granted to execute the trusted applet 118, processing continues at step 236 where a URL is sent from the client machine 104 to the client-server management software 108 of the server 102 for a list of all drivers that are available for the client machine 104. The URL sent to the client-server management software 108 contains system identification data, which is used by the client-server management software to retrieve from the file repository 110 the appropriate drivers. The client-server management software 108 retrieves, at step 237, a list of all software update options relevant to the client machine from the file repository 110 and transmits those software update options to the client machine 104. At step 238, the list of appropriate updates is displayed to the user, preferably in the form of an auto-filled pick list. The user of the client machine 104 may then, at step 240, select software, such as, for example, a driver, that is required to update or maintain the client machine 104. The selection is transmitted to the server 102. The software selection is received by the server 102 at step 241 and a determination is made at step 242 whether or not software selection has taken place. If it is determined at step 242 that software selection has taken place, the selected software is retrieved by the client-server management software 108 from the file repository 110 and transmitted to the client machine at step 245. The client machine 104, at step 246, receives the selected software and installs it as appropriate. If it is determined at step 242 that a software selection was not received, processing terminates.

Figure 3:
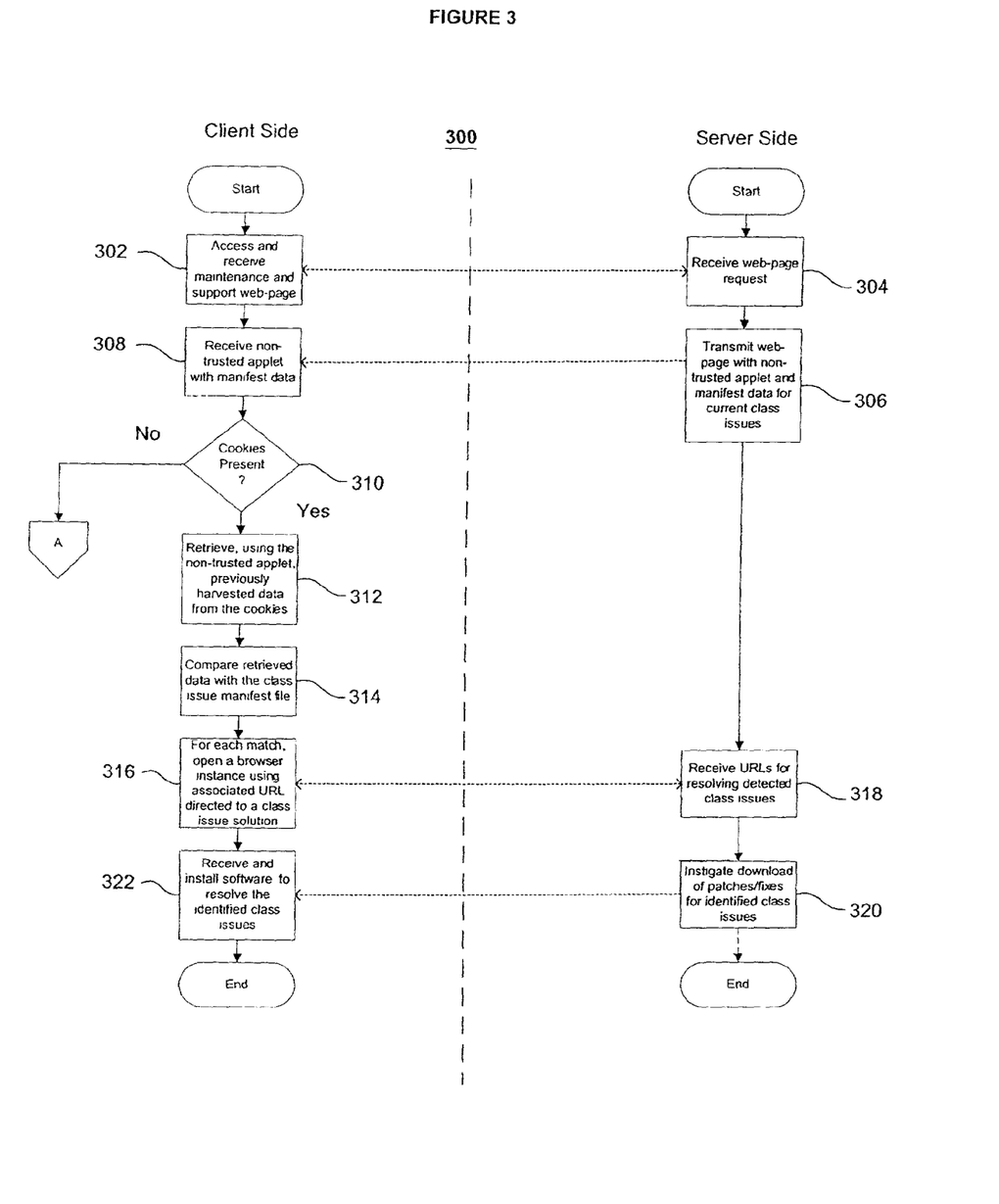
FIG. 3 illustrates a flow chart for utilising the harvested information according to an embodiment.

Referring to FIG. 3, there is shown a flow chart 300 illustrating the interaction between the client machine 104 and the server 102 upon, for example, a visit to the server 102 after the exchange illustrated in the flow chart 200 shown in FIG. 2, that is, after the enablement of proactive support. At step 302 the client machine 104 transmits a URL for support and maintenance web-page request to the server 102. The server 102 receives that web-page request at step 304 and in response retrieves from the file repository 110 the requested web-page together with the non-trusted applet 120 and manifest data containing a current class issue list. The current class issue list contains data relating to or identifying at least one class issue. Preferably, each class issue has an associated URL that is directed to the patch or fix for that class issue or to a suitable file, such as, for example a text file, which provides the user with instructions for addressing the class issue. The retrieved web-page, non-trusted applet and manifest data are transmitted to the client machine at step 306. The web-page, non-trusted applet 120 and manifest data are received by the client machine 104 at step 308. A determination is made by the non-trusted applet 120 at step 310 as to whether or not a cookie 138 containing system configuration data is present within the non-volatile storage area 130. If it is determined that such a cookie 138 is not present, processing can resume at step 236 of FIG. 2 or terminate. However, if the determination at step 310 identifies such a cookie, processing continues to step 312 in which the non-busted applet 120 extracts the previously harvested system resources data, that is, the system configuration and platform identification data and, at step 314, uses that extracted data to determine, in a comparison with the class issue manifest file, whether or not there are any class issues that are relevant to the client machine 104. At step 316, for each match between the extracted data and the class issues identified in the class issue manifest file, a browser instance is instantiated using a corresponding URL extracted from the class issue manifest file associated with a corresponding class issue. The URL's identifies corresponding downloads for addressing the associated class issues. At step 318 the server 102 receives the class issue URL's and, at step 320, retrieves from the file repository 110 appropriate class issue resolution information/software 140 and instigates a download of that information/software to the client machine 104 at step 320. At step 322 the client machine 104 receives the downloaded class issue resolution information/software 140 and deals with it as appropriate.

It will be appreciated that if the client machine receives information for resolving the class issue, that information will be displayed to the user. However, if the client machine receives software, the client machine will install that software as appropriate.

It can be appreciated from the above that the process, having initialised the client machine 104 using the exchange set out in the flow chart 200 of FIG. 2, of identifying and correcting class issues is substantially automated. This has the significant advantage that the client machines currently in use which potentially require class issues to be addressed can be identified more readily as compared to the prior art.

Referring to table 1 below, there is shown a segment of the content of a cookie, such as cookie 138, which illustrates the nature of the harvested system configuration and platform identification data. For example, it can be appreciated from the heading Win32_OperatingSystem that the current operating system of the client machine 104 is Microsoft Windows 2000, version 5, build 2195. Furthermore, the heading Win32_ComputerSystem shows the client machine 104 to be a Hewlett-Packard HP Omni Book 6000 manufactured by Hewlett-Packard. It can be appreciated that the cookie contains a significant amount of other data relevant to the client machine 104. The appendix provides a more comprehensive example of the content of a cookie such as cookie 138.

An example of the operation of the present invention will now be given, assuming that the initialisation process shown in the flow chart 200 of FIG. 2 has already been undertaken and assuming that there is a problem with the driver for the video card (not shown) of the client machine 104.

TABLE 1

*****row data found by System.getProperty*****************
browser vendor : null
OS : Windows NT
OS Version : 5.0
Browser: ActiveX Scripting Host
Browser Version : null
Java Vendor : 1.1.4
Java Version : Microsoft Corp.
user.dir: C:\Documents and Settings\owhadi.EUROPE2\Desktop
user main partition : C:\

TABLE 1-continued

```
codebase : http://gigag84/is911 dev/
fileSeparator : \
********row data found by IDVectra and so on tools********************
PC ID hexa value : P0x41
********row data found by assetAgent********************
Win32_OperatingSystem
    Caption : Microsoft Windows 2000
    Name : Win2K
    Version : 5.0 (Build 2195)
Win32_ComputerSystem
    Name : SYSBIOS
    Description : Hewlett-Packard HP OmniBook PC HP OmniBook 6000 EA
GenuineIntel Pentium III processor Microsoft Windows 2000 5.0 (Build 2195)
    Manufacturer : Hewlett-Packard
    Model : HIP OmniBook PC HP OmniBook 6000 EA
    PrimaryOwnerName :
    PrimaryOwnerContact : 779–6180
    TotalPhysicalMemory : 134217727
```

Assuming the manifest data file contains an indication that there is a class issue, that is, a technical problem, associated with the driver for the video card of the client machine 104, if the cookie 138 is present, the non-trusted applet 120 retrieves that cookie, at step 312, and compares, in step 314, the data stored within the cookie with the data contained within the class issue manifest file. It will be appreciated that the comparison will identity that there is a class issue associated with the ATI range mobility-M AGP video driver. Hence, an instance of the browser would be opened using a URL associated with the Win32_VideoConfiguration class issue at step 316. The server 102, in response to receiving a get command containing such a URL, will retrieve, from the file repository 110, class issue resolution software that is particular to the Win32_VideoConfiguration class issue and instigate a download of that software to the client machine 104 at steps 318 and 320. The client machine 104 receives the class issue resolution software 140 to fix the Win32_VideoConfiguration class issue at step 322 and takes appropriate action to install that software.

It can be appreciated from the above that since a non-trusted applet 120 is used and that the data necessary for that non-trusted applet to perform its intended function is available within a region of storage 130 that can be accessed by the non-trusted applet, there is no need to use a trusted applet to gain access to information that would ordinarily be inaccessible to such a non-trusted applet. Avoiding the need to use such a trusted applet 118 has the advantage that the user of the client machine 104 does not have to be aware of the need for maintenance and support services. Furthermore, the embodiments of the present invention have the advantage that the user does not have to seek and take steps to maintain the computer and its associated software. Preferably, such support and maintenance services are provided automatically whenever the user visits a server that provides the specific type of non-trusted applet as long as the system resources data has already been suitably stored within an appropriate area of memory. Therefore, such maintenance and support services are provided transparently to the user.

Even though the above embodiments have been described with reference to a user accessing a support and maintenance server 102 to obtain updated software for a client machine 104, the present invention is not limited to such arrangements. Embodiments can equally well be realised in which, having enabled pro-active support, the non-trusted applet 120 is downloaded automatically to the browser 116 upon the user accessing any, for example, Hewlett-Packard server, that is, the non-trusted applet is embedded within all web-pages. Therefore, it will be appreciated, with reference to FIG. 3, that step 302 may relate to a request for any type of web-page rather than to a specific maintenance and support URL request. Hence, in response to any access to a Hewlett-Packard server, processing proceeds from step 304 onwards and the non-trusted applet together with the manifest data may be loaded into the browser 116 of the client machine 114 via steps 306 and 308.

Although the above embodiments have been described with reference to an initialization process as shown in the flowchart 200 of FIG. 2, the embodiments are not limited to use of such an initialisation process. Embodiments can equally well be realised in which the system resources data is collated and stored in an environment of the client machine that is accessible by the non-trusted applet before the client machine is shipped. It will be appreciated that the additional advantages carried by such embodiments are that, firstly, the user does not have to be prompted to give permission to capture information relating to the current configuration of the system and, secondly, support and maintenance services can be provided in an even more transparent manner.

Although described in terms of an automatic download of software in response to detection of a class issue, the present invention is not limited thereto. Embodiments can be realised in which the requested data, rather than relating to or being installable software, can equally well be instructions to be undertaken by a user of the computer to enable that user to fix the technical problem. The instructions may take the form of text rendered within a web-browser, a text file or some other type of human-readable document. Alternatively, if the technical problem cannot be fixed by software installation or by user action, the downloaded data may be instructions for the user to contact technical personnel by email or some other means to arrange to have the problem fixed.

The above applications of the invention have been described in the context of providing maintenance and support services in the sense that a class issue is identified and preferably resolved. However, it will be appreciated by those skilled in the art that providing support to customers extends beyond addressing class issues. The support provided may extend to and encompass monitoring a customer's computing needs. For example, data reflecting the current configuration of a client machine may contain data identifying the expansion capabilities of a machine. For example, a client machine may have 128 Mb of resident RAM but have the capability to have 256 Mb of RAM. Therefore, the motherboard would have empty RAM sockets. Alternatively, the disk drive may be determined to be almost full. Hence, embodiments can be realised in which, rather than instigating the download of software to alleviate a class issue or producing an output message via a pop-up screen notifying either the user or a third party/system of the location of a machine having a class issue, the message may contain a recommendation of a possible update to the machine to improve the performance of the machine. The data identifying the expansion capabilities of the client machine may also be contained within the manifest file. In the above example, the recommended update may be to increase the RAM or to add another disk drive. The embodiments of the present invention therefore extend to pro-actively advising a user of a client machine of updates or changes that could be made to their machine to improve its performance. The non-trusted applet using the system resource data stored within the confined runtime environment together with the data relating to possible expansion capabilities contained within the manifest file can determine whether or not there are any opportunities for the user to expand or upgrade their machine.

APPENDIX

Cookie Data

```
      ********row data found by System.getProperty******************
      browser vendor : null
      OS : Windows NT
      OS Version : 5.0
      Browser : ActiveX Scripting Host
10    Browser Version : null
      Java Vendor : 1.1.4
      Java Version : Microsoft Corp.
      user.dir : C:\Documents and Settings\owhadi.EUROPE2\Desktop
      user main partition : C:\
15    codebase : http://gigag84/is911dev/
      fileSeparator : \
      ********row data found by IDVectra and so on tools******************
      PC ID hexa value : P0x41
      ********row data found by assetAgent******************
20
      Win32_OperatingSystem
           Caption : Microsoft Windows 2000
           Name : Win2K
           Version : 5.0 (Build 2195)
25
      Win32_ComputerSystem
           Name : SYSBIOS
           Description : Hewlett-Packard HP OmniBook PC HP OmniBook 6000 EA
      GenuineIntel Pentium III processor Microsoft Windows 2000 5.0 (Build 2195)
           Manufacturer : Hewlett-Packard
           Model : HP OmniBook PC HP OmniBook 6000 EA
           PrimaryOwnerName :
           PrimaryOwnerContact : 779-6180
           TotalPhysicalMemory : 134217727
      HP_ComputerSystem
           AssetNumber :
           SystemLocation : B2N2H4

      Win32_ComputerSystemProduct
           Name : HP OmniBook PC
           Version : HP OmniBook 6000 EA
           IdentifyingNumber : TW02807483
           Vendor : Hewlett-Packard
           UUID : 0 0 0 0 0 0 0 0 0 0 0 0 0 0 0 0

Win32_SystemEnclosure
           ChassisTypes : 10

HP Case 50007562
```

```
                    13

Description : Notebook - ChassisLock: Not Present or Unknown
         SerialNumber : None Win32_BIOS
             Manufacturer : Phoenix Technologies Ltd.
             ReleaseDate : 20000615******.******+***
             SMBIOSMajorVersion : 2
             SMBIOSMinorVersion : 3
             SMBIOSBIOSVersion : EA.M1.03
         Win32_Processor
             DeviceID : 0
             Description : Pentium III processor
             Manufacturer : GenuineIntel
             MaxClockSpeed : 700
             Family : 17
             CurrentClockSpeed : 700

Win32_DiskDrive
             DeviceID : 0
             Description : IDE Fixed Hard Disk
             Manufacturer : IBM-DARA-218000
             Model : IBM-DARA-218000
             Size : 18138193920
             InterfaceType : IDE HP_DiskDrive
             DeviceID : 0
             SerialNumber :      GZ0GZM23292
         Win32_LogicalDisk
             DeviceID : C:\
             Description : Fixed Drive
             FreeSpace : 372400128
             Size : 2140180480

Win32_LogicalDisk
             DeviceID : D:\
             Description : Fixed Drive
             FreeSpace : 9364235264
             Size : 15978331136

Win32_LogicalDisk
             DeviceID : E:\
             Description : CDROM Drive
             FreeSpace :
             Size :

Win32_CDROMDrive
             DeviceID : 0
             Availability : 1
             Drive : E:\

Win32_VideoConfiguration

HP Case 50007562
```

```
                    14

ActualColorResolution : 16
        AdapterDescription : ATI RAGE MOBILITY-M AGP (English)
        AdapterRAM : 8388608
        RefreshRate : 60
        HorizontalResolution : 1024
        VerticalResolution : 768

Win32_CacheMemory
            DeviceID : 0
            Purpose : L1 Cache
            InstalledSize : 32
            Level : 1

Win32_CacheMemory
            DeviceID : 1
            Purpose : L2 Cache
            InstalledSize : 256
            Level : 2

        Win32_PhysicalMemoryArray
            MaxCapacity : 131072
            MemoryDevices : 2

Win32_PhysicalMemory
            Tag : 0
            BankLabel : Bank 0, Bank 1
            Capacity : 134217728
            Description : SDRAM/DIMM
            FormFactor : 8
            MemoryType : 18
            Speed : 60

Win32_PhysicalMemory
            Tag : 1
            BankLabel : Bank 2, Bank 3
            Capacity :
            Description : SDRAM/DIMM
            FormFactor : 8
            MemoryType : 18
            Speed : 60

Win32_PortConnector
            Tag : 0
            Description : Serial Port 16550A Compatible - Connector: DB-9 pin male
            PortType : 9
            ConnectorType : 8

Win32_PortConnector
            Tag : 1
            Description : Serial Port 16550A Compatible - Connector: Infrared
            PortType : 9
            ConnectorType : 16

Win32_PortConnector

HP Case 50007562
```

```
                    Tag : 2
                    Description : Parallel Port ECP/EPP - Connector: DB-25 pin female
                    PortType : 5
                    ConnectorType : 5
     5
                Win32_PortConnector
                    Tag : 3
                    Description : Keyboard Port - Connector: Circular DIN-8 male
                    PortType : 13
                    ConnectorType : 20

Win32_PortConnector
                    Tag : 4
                    Description : Keyboard Port - Connector: Circular DIN-8 male
                    PortType : 13
                    ConnectorType : 20

Win32_PortConnector
                    Tag : 5
    20              Description : None - Connector: None
                    PortType : 0
                    ConnectorType : 0

Win32_PortConnector
                    Tag : 6
                    Description : None - Connector: None
                    PortType : 0
                    ConnectorType : 0

            Win32_Keyboard
                    DeviceID : 0
                    Description : IBM enhanced (101- or 102-key) keyboard
                    Layout : 00000409

            Win32_NetworkAdapter
                    DeviceID : 0
                    Description : 3Com 10/100 Mini PCI Ethernet Adapter
                    Speed : 10000000
                    MACAddress : 00-00-86-41-C2-E6
                Win32_PointingDevice
                    DeviceID : 0
                    Description : LOGITECH PS2 MOUSE
                    NumberOfButtons : 2
                Win32_DesktopMonitor
                    DeviceID : 0
                    MonitorManufacturer :
                    MonitorType : Digital Flat Panel (1024x768)
                HP_DesktopMonitor
                    DeviceID : 0
                    SerialNumber :
                    AssetNumber :

HP Case 50007562
```

16

```
          HP_Configuration
                  MachineName : SYSBIOS
                  NumberOfSerialPorts : 2
                  NumberOfParallelPorts : 1
                  NumberOfFloppies : 0
                  NumberOfFreeMemorySlots : 1

Win32_SystemDriver
                  Name : ATI Miniport for Windows NT
                  Description : ATI2MPAB Miniport Driver
                  PathName : C:\WINNT\System32\DRIVERS\ati2mpab.sys HP_SystemDriver
                  DriverType : Video Driver
                  DriverFileDate : 2000/04/24  16:46:44
                  DriverFileSize : 255872
                  FileName : ati2mpab.sys
                  Manufacturer : ATI Technologies Inc.
                  Name : ATI Miniport for Windows NT
                  Version : 5.00.2195.4016.1.hp Win32_SystemDriver
                  Name : 3Com 10/100 Mini PCI Ethernet Adapter
                  Description : 3Com 10/100 Mini PCI Ethernet Adapter Driver
                  PathName : C:\WINNT\System32\DRIVERS\EL556ND5.sys HP_SystemDriver
                  DriverType : Lan Driver
                  DriverFileDate : 2000/03/08  09:33:30
                  DriverFileSize : 63525
                  FileName : EL556ND5.sys
                  Manufacturer : 3Com Corporation
                  Name : 3Com 10/100 Mini PCI Ethernet Adapter
                  Version : 1.10.11.000

Win32_SystemDriver
                  Name : Microsoft(R) Windows (R) 2000 Operating System
                  Description : IDE/ATAPI Port Driver
                  PathName : C:\WINNT\System32\DRIVERS\atapi.sys HP_SystemDriver
                  DriverType : SCSI Driver
                  DriverFileDate : 1999/12/07  11:00:00
                  DriverFileSize : 84976
                  FileName : atapi.sys
                  Manufacturer : Microsoft Corporation
                  Name : Microsoft(R) Windows (R) 2000 Operating System
                  Version : 5.00.2194.1
          Win32_SystemDriver
                  Name : Microsoft(R) Windows (R) 2000 Operating System
                  Description : Symbios Logic Inc. SCSI Miniport Driver
                  PathName : C:\WINNT\System32\DRIVERS\symc810.sys HP Case 50007562
```

17

```
        HP_SystemDriver
              DriverType : SCSI Driver
              DriverFileDate : 1999/09/25  10:11:50
              DriverFileSize : 16624
              FileName : symc810.sys
              Manufacturer : Symbios Logic Inc.
              Name : Microsoft(R) Windows (R) 2000 Operating System
              Version : 5.00.2134.1
        Win32_SystemDriver
              Name : Microsoft(R) Windows (R) 2000 Operating System
              Description : Windows NT Fax Driver
              PathName :-C:\WINNT\System32\spool\DRIVERS\W32X86\3\FAXDRV.DLL
        HP_SystemDriver
              DriverType : Printer Driver
              DriverFileDate : 1999/11/30  22:39:02
              DriverFileSize : 15120
              FileName : FAXDRV.DLL
              Manufacturer : Microsoft Corporation
              Name : Microsoft(R) Windows (R) 2000 Operating System
              Version : 5.00.2134.1

       Win32_SystemDriver
              Name : Microsoft(R) Windows (R) 2000 Operating System
              Description : HP LaserJet 5Si MX
              PathName : C:\WINNT\System32\spool\DRIVERS\W32X86\3\UNIDRV.DLL
       HP_SystemDriver
              DriverType : Printer Driver
              DriverFileDate : 1999/11/30  22:39:50
              DriverFileSize : 164624
              FileName : UNIDRV.DLL
              Manufacturer : Microsoft Corporation
              Name : Microsoft(R) Windows (R) 2000 Operating System
              Version : 5.00.2149.1

Win32_SystemDriver
              Name : HP Printing System for Windows
              Description : HP 2500C Series Printer
              PathName : C:\WINNT\System32\spool\DRIVERS\W32X86\2\HPW6Akmd.dll HP_SystemDriver
              DriverType : Printer Driver
              DriverFileDate : 2000/02/10  23:00:00
              DriverFileSize : 22368
              FileName : HPW6Akmd.dll
              Manufacturer : Hewlett-Packard Company
              Name : HP Printing System for Windows
              Version : 2000.0211.0.0

Win32_SoftwareElement
              Name : HP TopTools for Desktops WMI Agent

HP Case 50007562
```

18

```
            Description : HP TopTools for Desktops WMI Agent
            Manufacturer : Hewlett-Packard
            Version : 5.0.29
            LanguageEdition : English (United States)
            Path :

Win32_SoftwareElement
            Name : Microsoft Access 2000
            Description : Microsoft Access 2000
            Manufacturer : Microsoft Corporation
            Version : 9.00.2720
            LanguageEdition : English (United States)
            Path :

        Win32_SoftwareElement
            Name : Microsoft Office 2000 Standard
            Description : Microsoft Office 2000 Standard
            Manufacturer : Microsoft Corporation
            Version : 9.00.2720
            LanguageEdition : English (United States)
            Path :

Win32_SoftwareElement
            Name : Microsoft Outlook 2000
            Description : Microsoft Outlook 2000
            Manufacturer : Microsoft Corporation
            Version : 9.00.2720
            LanguageEdition : English (United States)
            Path :
        Win32_SoftwareElement
            Name : WebFldrs
            Description : WebFldrs
            Manufacturer : Microsoft Corporation
            Version : 9.00.3501
            LanguageEdition : English (United States)
            Path :
```

The invention claimed is:

1. A method for determining the occurrence of a class issue within a first computer comprising at least a first storage device for storing data relating to the system resources of the first computer; the system resources comprising at least one of hardware and software of the first computer; the method comprising the steps of:
- receiving, from an internet source a first application, the first application being a trusted application for identifying the system resources of the first computer;
- searching for and collating computer hardware and/or software identification information of the hardware and/or software of the first computer using the first application;
- creating a data entity containing the computer hardware and/or software identification information or from which said information can be identified and storing the data entity storage device such that the data entity can be subsequently accessed by other applications;
- receiving data identifying at least one class issue potentially associated with the system resources;
- determining, using a second application, whether or not data relating to the system resources corresponds to the data identifying the at least one class issue; and
- outputting a message relating to the at least one class issue if the computer hardware and/or software identification information corresponds to the data identifying the at least one class issue.

2. A method as claimed in claim 1 in which the step of outputting a message comprises the step of transmitting, to a second computer, a request to instigate the download of data from the second computer to address the at least one technical issue in response to determining that there is a correspondence between the data relating to the system resources and the data identifying the at least one technical issue; and receiving the requested data to address the at least one technical issue.

3. A method as claimed in claim 1 in which the step of outputting a message comprises the step of outputting a message containing a reference to a data source to cause further data relating to the at least one technical issue to be rendered within a web-browser.

4. A method as claimed in claim 1 in which the first application is at least one of a trusted Java applet and a trusted ActiveX application.

5. A method as claimed in claim 1 in which the second application is a non-trusted application.

6. A method as claimed in claim 5 in which the non-trusted application is at least one of a non-trusted Java applet and a non-trusted ActiveX application.

7. A method as claimed in claim 5 in which the data entity is at least one of a cookie or file.

* * * * *